(12) United States Patent
Wenske

(10) Patent No.: US 8,611,487 B2
(45) Date of Patent: Dec. 17, 2013

(54) ENHANCED PHASE DISCRIMINATOR FOR FAST PHASE ALIGNMENT

(75) Inventor: Holger Wenske, Freising (DE)

(73) Assignee: Intel Mobile Communications GmbH, Neubiberg (DE)

( * ) Notice: Subject to any disclaimer, the term of this patent is extended or adjusted under 35 U.S.C. 154(b) by 259 days.

(21) Appl. No.: 13/173,377

(22) Filed: Jun. 30, 2011

(65) Prior Publication Data

US 2013/0003907 A1    Jan. 3, 2013

(51) Int. Cl.
*H03D 3/24*    (2006.01)
(52) U.S. Cl.
USPC ........... 375/375; 375/371; 375/376; 327/147; 327/156
(58) Field of Classification Search
USPC ............................ 375/371–376; 327/147–163
See application file for complete search history.

(56) References Cited

U.S. PATENT DOCUMENTS

| | | | |
|---|---|---|---|
| 5,068,628 A | 11/1991 | Ghoshal | |
| 7,113,560 B1 | 9/2006 | Huang et al. | |
| 7,340,021 B1 | 3/2008 | Churchill et al. | |
| 7,457,391 B2 | 11/2008 | Gregorius et al. | |
| 2004/0088594 A1 | 5/2004 | Canagasaby et al. | |
| 2005/0238126 A1 | 10/2005 | Ribo et al. | |
| 2007/0047683 A1* | 3/2007 | Okamura et al. | 375/355 |
| 2008/0080649 A1* | 4/2008 | Gibbons et al. | 375/355 |
| 2010/0322367 A1 | 12/2010 | Wenske et al. | |
| 2011/0064176 A1* | 3/2011 | Takada | 375/355 |

OTHER PUBLICATIONS

International Search Report dated Oct. 5, 2012 in connection with Application No. PCT/EP2012/062317.

* cited by examiner

*Primary Examiner* — Curtis Odom
(74) *Attorney, Agent, or Firm* — Eschweiler & Associates, LLC

(57) ABSTRACT

One embodiment of the present invention relates to a phase alignment system including a plurality of samplers, a clock distributor, a phase detector and a phase alignment control. The samplers are configured to receive an incoming signal and a phase adjusted clock signal and to provide samples according to the incoming signal. The clock distributor receives a clock adjustment signal and generates the phase adjusted clock signal, which triggers sampling of the incoming signal. The clock adjustment signal indicates a direction of phase adjustment and can include an amount of phase adjustment. The phase detector receives the samples and provides extended phase alignment commands derived from the samples. The phase alignment control receives the extended phase alignment commands and provides the clock adjustment signal to the clock distributor.

20 Claims, 6 Drawing Sheets

| SEQ/CYC | data1' | edge2 | data2 | edge1 | data1 |
|---|---|---|---|---|---|
| 1 | 0 | 0 | 0 | 0 | 0 |
| 2 | 0 | 0 | 0 | 0 | 1 |
| 3 | 0 | 0 | 0 | 1 | 0 |
| 4 | 0 | 0 | 0 | 1 | 1 |
| 5 | 0 | 0 | 1 | 0 | 0 |
| 6 | 0 | 0 | 1 | 0 | 1 |
| 7 | 0 | 0 | 1 | 1 | 0 |
| 8 | 0 | 0 | 1 | 1 | 1 |
| 9 | 0 | 1 | 0 | 0 | 0 |
| 10 | 0 | 1 | 0 | 0 | 1 |
| 11 | 0 | 1 | 0 | 1 | 0 |
| 12 | 0 | 1 | 0 | 1 | 1 |
| 13 | 0 | 1 | 1 | 0 | 0 |
| 14 | 0 | 1 | 1 | 0 | 1 |
| 15 | 0 | 1 | 1 | 1 | 0 |
| 16 | 0 | 1 | 1 | 1 | 1 |
| 17 | 1 | 0 | 0 | 0 | 0 |
| 18 | 1 | 0 | 0 | 0 | 1 |
| 19 | 1 | 0 | 0 | 1 | 0 |
| 20 | 1 | 0 | 0 | 1 | 1 |
| 21 | 1 | 0 | 1 | 0 | 0 |
| 22 | 1 | 0 | 1 | 0 | 1 |
| 23 | 1 | 0 | 1 | 1 | 0 |
| 24 | 1 | 0 | 1 | 1 | 1 |
| 25 | 1 | 1 | 0 | 0 | 0 |
| 26 | 1 | 1 | 0 | 0 | 1 |
| 27 | 1 | 1 | 0 | 1 | 0 |
| 28 | 1 | 1 | 0 | 1 | 1 |
| 29 | 1 | 1 | 1 | 0 | 0 |
| 30 | 1 | 1 | 1 | 0 | 1 |
| 31 | 1 | 1 | 1 | 1 | 0 |
| 32 | 1 | 1 | 1 | 1 | 1 |

FIG. 4A

| SEQ/CYC | d1'e2 | e2d2 | d2e1 | e1d1 | command |
|---|---|---|---|---|---|
| 1 | 0 | 0 | 0 | 0 | wait |
| 2 | 0 | 0 | 0 | 1 | forward |
| 3 | 0 | 0 | 1 | 1 | invert |
| 4 | 0 | 0 | 1 | 0 | back |
| 5 | 0 | 1 | 1 | 0 | done |
| 6 | 0 | 1 | 1 | 1 | p forward |
| 7 | 0 | 1 | 0 | 1 | forward |
| 8 | 0 | 1 | 0 | 0 | forward |
| 9 | 1 | 1 | 0 | 0 | invert |
| 10 | 1 | 1 | 0 | 1 | p forward |
| 11 | 1 | 1 | 1 | 1 | p back |
| 12 | 1 | 1 | 1 | 0 | p back |
| 13 | 1 | 0 | 1 | 0 | back |
| 14 | 1 | 0 | 1 | 1 | p back |
| 15 | 1 | 0 | 0 | 1 | done |
| 16 | 1 | 0 | 0 | 0 | back |
| 17 | 1 | 0 | 0 | 0 | back |
| 18 | 1 | 0 | 0 | 1 | done |
| 19 | 1 | 0 | 1 | 1 | p back |
| 20 | 1 | 0 | 1 | 0 | back |
| 21 | 1 | 1 | 1 | 0 | pback |
| 22 | 1 | 1 | 1 | 1 | pback |
| 23 | 1 | 1 | 0 | 1 | p forward |
| 24 | 1 | 1 | 0 | 0 | invert |
| 25 | 0 | 1 | 0 | 0 | forward |
| 26 | 0 | 1 | 0 | 1 | forward |
| 27 | 0 | 1 | 1 | 1 | p forward |
| 28 | 0 | 1 | 1 | 0 | done |
| 29 | 0 | 0 | 1 | 0 | back |
| 30 | 0 | 0 | 1 | 1 | invert |
| 31 | 0 | 0 | 0 | 1 | forward |
| 32 | 0 | 0 | 0 | 0 | wait |

FIG. 4B

ENHANCED PHASE DISCRIMINATOR FOR FAST PHASE ALIGNMENT

BACKGROUND OF THE INVENTION

Digital data streams permit high amounts of data to be transmitted over relatively long distances, often at high frequencies. For example, high speed serial data streams may transmit data in Gigabit range and higher. Some digital data streams, especially high-speed serial data streams are transmitted without an accompanying clock signal. A transceiver generates a clock from an approximate frequency reference and then phase-aligns to transitions in the data stream. Many digital data streams require relatively small preambles and large payloads in order to meet data rate transfer requires. Thus, these streams require fast locking on incoming data.

The circuits that lock onto incoming digital data streams are referred to as clock and data recovery unites (CDR). These modules are present within transceiver/receiver modules and perform phase alignment and phase picking to lock onto incoming data streams. Phase alignment attempts to set the sampling time to a center of a received signal (bit cell). In one example, a conventional system utilizes a phase locked loop (PLL) to perform phase alignment. Phase picking detects data transitions and picks data samples furthest away from detected data transitions.

Conventional solutions use classical phase detectors, including exclusive OR (XOR) detectors and are challenged by high frequency signals with short preambles. The conventional solutions suffer from limitations on usable synchronization preambles and voltage offset tolerances. The classical phase detectors only provide limited output signals. As a result, long dead times can occur when no clear phase relation between input pattern and sampling clock is present. This can prevent phase alignment logic from operating fast or correctly.

Classical high speed clock and data recover circuits try to keep the sampling point for a data sampler at an optimum point by watching samples at slopes and/or edges of an input signal. Clock phase changes are then derived out of a number of samples detecting a sufficient number of slopes.

Generally, if the slope is between leading edge sample point and data sample point, then the data sampling can be considered late. If the slope is between a data sample point and following edge sample point, the data sampling is too early. If there are slopes in both time sections, then no action is taken and there is phase alignment. If there is sampling error or noise, such as too many detected transitions in a cycle, no action is taken and needed adjustments can be delayed. The conventional systems will wait until additional samples are obtained. Further, the prevalent use of short preambles and/or synchronization periods, can further delay phase locking and prevent or reduce data transmission.

BRIEF DESCRIPTION OF THE DRAWINGS

FIG. 4A shows an example of possible samples for a configuration of a phase detector in accordance with an embodiment of the invention.

FIG. 4B shows derived slopes and commands according to the samples of FIG. 4A.

DETAILED DESCRIPTION OF THE INVENTION

Figure 1:
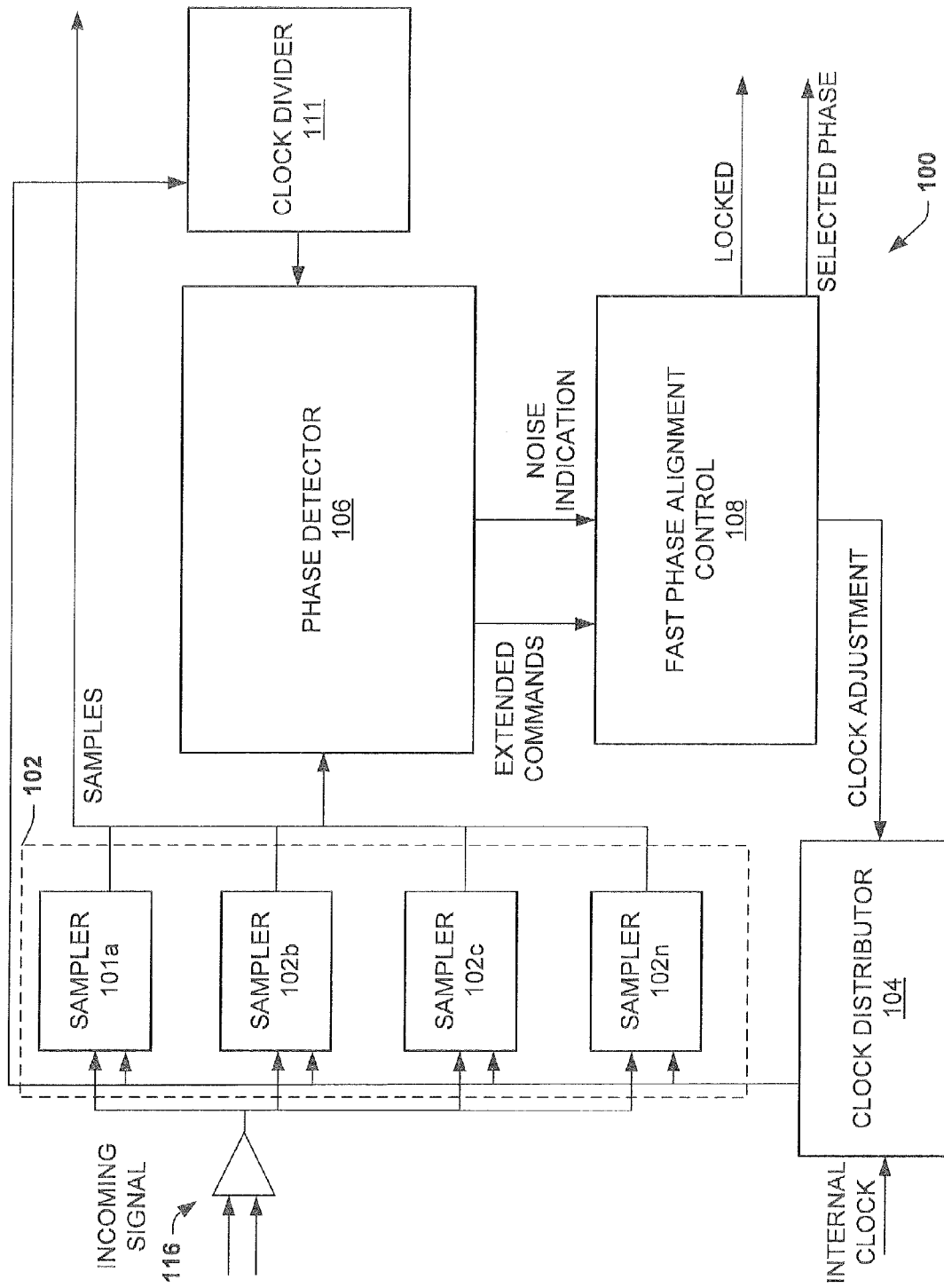
FIG. 1 is a block diagram of a phase alignment system in accordance with an embodiment of the invention.

One embodiment of the present invention relates to a phase alignment system including a plurality of samplers, a clock distributor, a phase detector and a phase alignment control. The samplers are configured to receive an incoming signal and a phase adjusted clock signal and to provide samples according to the incoming signal. The clock distributor receives a clock adjustment signal and generates the phase adjusted clock signal, which triggers sampling of the incoming signal. The clock adjustment signal indicates a direction of phase adjustment and can include an amount of phase adjustment. The phase detector receives the samples and provides extended phase alignment commands derived from the samples. The phase alignment control receives the extended phase alignment commands and provides the clock adjustment signal to the clock distributor. In an alternate embodiment, the extended phase alignment commands include probable commands.

Another embodiment of the present invention relates to a phase alignment system including a plurality of samplers, a clock distributor, a phase detector, a phase alignment control and noise logic. The samplers are configured to receive an incoming signal and a phase adjusted clock signal and to provide samples according to the incoming signal. The clock distributor receives a clock adjustment signal and generates the phase adjusted clock signal, which triggers sampling of the incoming signal. The clock adjustment signal indicates a direction of phase adjustment and can include an amount of phase adjustment. The phase detector receives the samples and provides extended phase alignment commands derived from the samples. The phase alignment control receives the extended phase alignment commands and a noise indication signal and provides the clock adjustment signal to the clock distributor. The noise logic analyzes the incoming signal and/or samples for indications of noise or voltage offsets and provides the noise indication signal to the phase alignment control. The noise indication signal includes information on the probability of noise and/or voltage offsets being present and can indicate the probability of possible commands being wrong, thereby improving locking time and providing reasonable adjustments. In an alternate embodiment, the extended phase alignment commands include probable commands, such as probable forward and probable back.

In another embodiment of the invention, a method of performing phase alignment is performed. An incoming signal is sampled according to a phase adjusted clock signal. The incoming signal is a serial, digital data stream. A specified number of samples are typically obtained per clock phase of the incoming signal. The samples are utilized to generate slope indicators, which indicate a presence of transitions between individual samples of the generated samples. Extended phase alignment commands are then generated according to the slope indicators. The extended phase alignment commands include directions for sequences of slop indicators that conventional systems deem ambiguous. A noise indication signal is generated by analyzing the incoming signal and/or samples for noise, including voltage offsets.

A clock adjustment signal is generated according to the extended phase alignment commands and the noise indication signal. This clock adjustment signal is than utilized to sample a next clock phase of the incoming signal.

The present invention will now be described with reference to the attached drawing figures, wherein like reference numerals are used to refer to like elements throughout, and wherein the illustrated structures and devices are not necessarily drawn to scale.

FIG. 1 is a block diagram of a phase alignment system 100 in accordance with an embodiment of the invention. The system 100 performed phase alignment using enhanced phase discrimination. The system 100 locks onto incoming digital signals in a relatively short time by interpreting conventionally considered ambiguous samples and utilizing an appropriate number of samples. The system 100 accomplishes this in part by considering or performing phase adjustments that conventional systems are unaware of and/or deemed ambiguous.

The system includes samplers 102, a clock distributor 104, a phase detector 106, a fast phase alignment control unit 108, and a clock divider 111. An incoming signal 116 is received by the samplers 102. The incoming signal is a digital data stream, such as a data burst, communication signal, and the like. The samplers 102 are configured to sample an incoming signal at several time points of one clock phase. A goal is to obtain data samples at a sampling point beneficial to obtain data from the incoming signal and to obtain edge samples at a sampling point near to transitions or signal slopes of the incoming signal 116. In one example, the samplers 102 sample the incoming signal on rising or falling edges of phase adjusted clock signal(s).

The samplers 102 can be configured in a variety of suitable ways to obtain samples of the incoming signal 116 based on the phase adjusted clock signal. The samplers 102 can be arranged in single or multiple sampling stages. The samplers 102 can be designated as edge samplers or data samplers or the designation can be determined dynamically during operation. In one example, the samplers 102 are analog to digital converters, particularly when an amplitude of the incoming signal is small, e.g., 50 mV.

Generally, the number of samplers 102 present in the system 100 and/or the number samples obtained per clock phase can vary according to a variety of factors including, but not limited to, the frequency of the incoming signal, the data rate of the incoming signal, preamble size, noise levels, possible voltage offsets, payload, desired phase lock time, and the like. The samples, typically comprising edge and data samples, are then provided to the phase detector 106 for analysis. In one example, a first sampler 102a operates as a data sampler and samples the incoming signal 116 on arising edge of the phase adjusted clock signal. A second sampler 102b operates as an edge sampler and samples the incoming signal 116 on a second, falling edge of the phase adjusted clock signal. A third sampler 102c operates as a data sampler and samples the incoming signal on a third edge of the phase adjusted clock signal. A fourth sampler of the samplers 102 the incoming signal on a fourth edge of the phase adjusted clock signal.

In another example, the phase adjusted clock signal comprises a plurality of clock signals phase adjusted relative to one another. For example, a first sampler operates as a data sampler and samples the incoming signal 116 on a rising edge of a first signal of the phase adjusted clock signal. A second sampler operates as an edge sampler and samples the incoming signal 116 on a rising edge of a second signal of the phase adjusted clock signal. A third sampler operates as a second data sampler and samples the incoming signal 116 on a rising edge of a third signal of the phase adjusted clock signal. A fourth sampler operates as a second edge sampler and samples the incoming signal 116 on a rising edge of a fourth signal of the phase adjusted clock signal.

The clock distributor 104 is configured to supply one or more internally generated clock signals, referred to as the phase adjusted clock signal 118. The phase adjusted clock 118 is generated according to an internal clock and a clock adjustment signal. In one example, a decoder mux is used to select one of a plurality of available phases. The signals or phases are typically phase shifted relative to one another and are provided to the samplers 102. The clock distributor 104 varies the phase of the internally generated clock signal in order to sample different points of the incoming signal 116 based on the rising and/or falling edges of the phase adjusted clock signals. The phases are varied according to the clock adjustment signal, which indicates an adjustment from the current phase. In one example, the clock adjustment signal indicates a direction of phase adjustment from the current phase. In another example, the clock adjustment signal indicates whether an earlier phase or later phase than the current phase should be used. In yet another example, the clock adjustment signal includes a direction of phase adjustment, such as forward or back, and an amount of adjustment.

The phase detector 106 analyzes the samples to identify when a transition has occurred and generates commands to modify or adjust the phase adjustment signal. Generally, if the slope is between leading edge sample point and data sample point, then the data sampling can be considered late. If the slope is between a data sample point and following edge sample point, the data sampling is too early. If there are slopes in both time sections, then no action is taken and there is phase alignment. If there are addition slopes present, noise may be a factor, but probable adjustments can be determined.

The phase detector 106 receives the samples from the samplers 102 and generates the extended commands, also referred to as corrections, according to the received samples. Additionally, the phase detector 106 receives a divided clock and provides a noise indication signal. The samples represent a sequence of data points, samples or values of the incoming signal at regular points (phases) in time. Typically, the samples are categorized as data samples and edge samples. The data samples represent expected data portions of the incoming signal 116 and the edge samples indicate expected edge portions of the incoming signal. The samples themselves comprise of logical values such as 0, 1, high, or low. For example, a "0" may represent a sample on the incoming signal being low or "0" or negative and a "1" may represent a sample on the incoming signal being high or "1" or positive.

The phase detector 106 generates a command, typically one for each clock phase, cycle or bit of data according to the received samples once the least necessary number of samples for making a decision are available. Conventional systems are configured to only indicate a limited number of commands, such as forward, backward or wait. However, the phase detector 106 has an expanded set of commands at least partially not present in conventional systems. As a result, phase alignment can occur relatively quicker than with conventional systems. In contrast, the phase detector 106 generates a greater number of commands than conventional systems.

In the current embodiment, the phase detector 106 generates an expanded set of commands including, but not limited to wait, back, forward, done, invert, probable back, and probably forward. The "wait" command indicates do nothing, wait for more samples. The "back" command indicates that a clock phase later than a current used clock phase should be used. The "forward" command indicates that a clock phase earlier than a current used clock phase should be used. The "done" command indicates that the currently used clock phase fits. The "invert" command indicates that the currently used clock phase shifted by 180 degrees fits. The "probable forward" command indicates that there may be a sampling error, but a clock phase earlier than the currently used clock phase probably should be used. The "probable back" command indicates that there may a sampling error, but a clock phase later than the currently used clock phase should probably be used. The sampling errors can be the result of noise in the incoming signal 116 and/or a voltage offset in the incoming signal. It is appreciated that the above provided expanded command set is provided as an example and that other sets of commands are contemplated and in accordance with the invention.

The divided clock received by the phase detector 106 can comprise one or more divided clocks of the phase alignment clock. The divided clock permits the phase detector 106 to operate with multiple latching stages with one or more divided clocks so as to store samples for different durations and/or at different sample points. The divided clock facilitates maintaining the samples and/or other information until transitions are identified and commands are generated.

Noise and offsets are often present in the incoming signal 116 and can be introduced from distortions and interference such as reflections, attenuation, crosstalk, and interference. The phase detector 106 analyzes transitions or slopes to determine the probability of noise and/or voltage offsets present in the incoming signal. As a result, the noise indication signal is generated and includes information on the probability of noise and/or voltage offsets being present and can indicate the probability of possible commands being wrong. Using the noise indication signal can improving locking time and prove reasonable adjustments.

The fast phase alignment control 108 receives the extended commands from the phase detector 106 and provides the clock adjustment signal to the clock distributor 104. Additionally, the phase alignment control 108 receives the noise indication signal. Further, the phase alignment control 108 provides a selected phase signal and a locked signal. The phase alignment control 108 stores the history of received extended commands from the phase detector to decide if the phase alignment is achieved. In one example, the phase alignment control 108 includes a memory component for storing and analyzing received extended commands. The selected phase signal identifies a current or selected phase. The selected phase signal indicates that phase alignment is occurring or has occurred and can be received by other transceiver components (not shown). The locked signal can be generated on receiving an appropriate command, such as "done", from the phase detector 106 or if the stored history of extended phase detector commands show attainment of a finish state. The locked signal indicates the end of fast phase alignment and validity of the selected phase output.

The clock adjustment signal informs the clock distributor 104 whether to use an earlier clock phase, a later clock phase, or no adjustment. Additionally, the clock adjustment signal can specify an amount of adjustment as well as the direction. The clock adjustment signal is generated according to the command from the phase detector 106 and the noise indication signal. If the noise indication signal indicates that noise in the incoming signal is above a threshold value, the phase alignment control 108 can determine that a probably forward or a probably back is the result of noise and avoid an erroneous phase adjustment. However, if the noise indication signal is below a threshold value, the phase alignment control 108 can determine that a probably forward or a probably back is likely a forward or a back and set the clock adjustment signal to earlier or later, respectively. The threshold value can be designed into the system or can be determined by the system 100 dynamically. The threshold value is dependent on likelihood or probability. In one example, the threshold value is selected so that the likelihood of a proposed adjustment yielding a correction in the proper direction is greater than 50 percent.

The clock divider 111 receives the phase adjusted clock signal and divides the signal into a divided clock, which is provided to the phase detector 106. The divided clock can comprise one or more divided clock signals and can be utilized by the phase detector 106 to obtain or utilize samples from other clock phases or cycles, as described above.

It is appreciated that variations in the phase alignment system 100 are contemplated in accordance with the invention. Suitable components can be added and disclosed components can be omitted or modified and still be in accordance with the invention.

Figure 2:
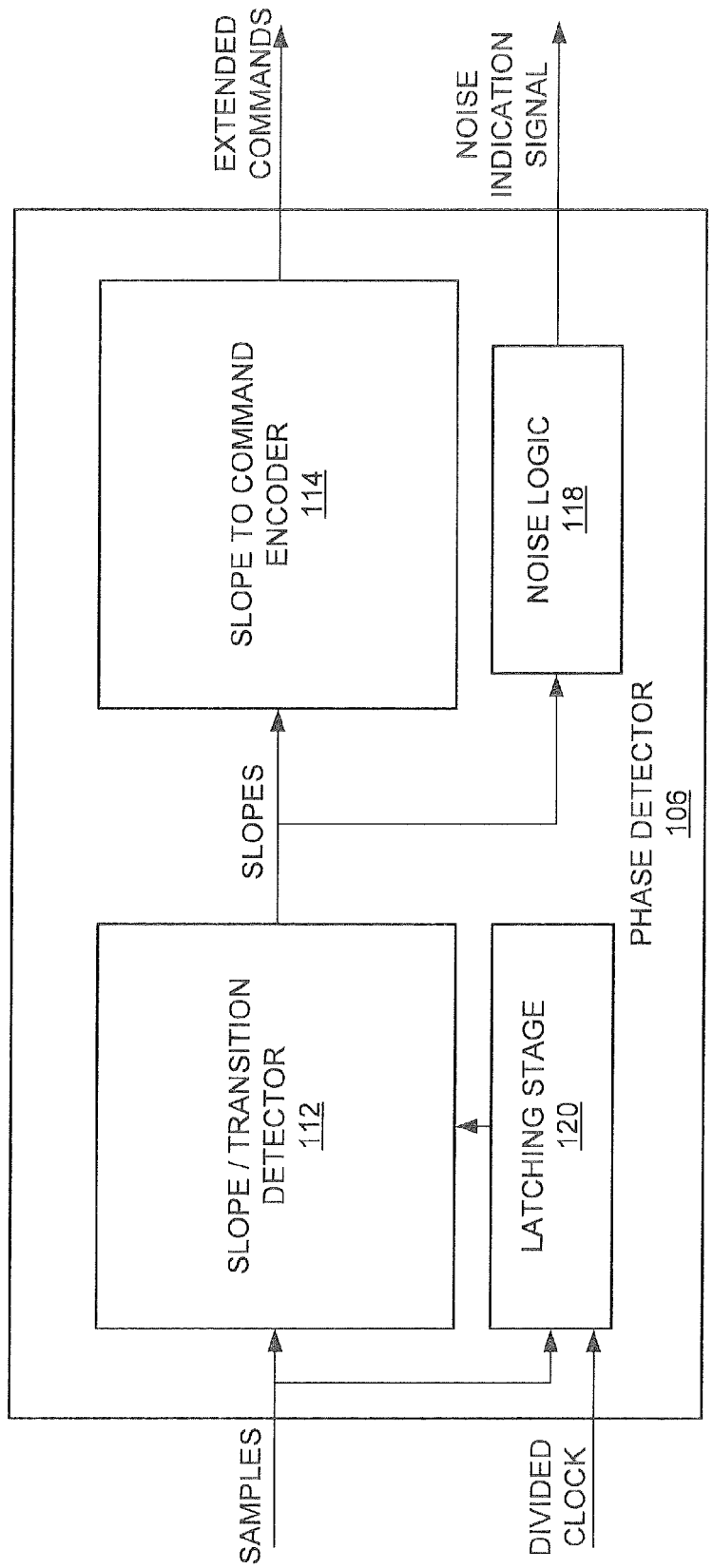
FIG. 2 is a block diagram illustrating a phase detector in accordance with the invention.

FIG. 2 is a block diagram illustrating a phase detector 106 in accordance with the invention. The phase detector 106 can be employed with the system 100 of FIG. 1. The phase detector 106 receives samples and generates commands indicating phase adjustments as a result. The phase detector 106 is shown in one configuration, however other suitable configurations are contemplated and in accordance with the invention.

The samples are received for a given clock phase, also referred to as cycle or data unit. As stated above, the samples represent a sequence of data points or values of the incoming signal at regular points (phases) in time. Typically, the samples are categorized as data samples and edge samples. The data samples indicate expected data portions of the incoming signal 116 and the edge samples indicate expected edge portions of the incoming signal. The samples themselves comprise logical values such as 0, 1, high, or low. For example, a "0" may represent a sample on the incoming signal being low or "0" and a "1" may represent a sample on the incoming signal being high or "1".

The phase detector 106 includes a slope detector 112, a slope to command encoder 114, noise logic 118, and a latching stage 120. The latching stage 120 is configured to store or latch one or more samples from prior cycles. The current embodiment utilizes a divided clock for the latching stage 120; however alternate embodiments can incorporate other mechanisms to maintain samples from prior cycles or clock phases. In one example, the latching stage 120 maintains a last data sample of a previous cycle. In another example, the latching stage 120 maintains a data sample from a prior phase.

The slope detector 112 analyzes the samples and generates a sequence of slope indicators according to the samples. Each indicator shows whether there has been a transition or slope from one sample to another sample. If the phase adjusted clock signal fits the incoming signal, the transitions should occur at edge samples, thereby verifying presence of the edges. The slope detector 112 provides the sequence of slope indicators to the slope to command encoder 114.

In one example, 4 samples from a current cycle and a last sample from a previous cycle are analyzed to identify slopes or transitions. Thus, if a first sample indicates a 0 and a second sample indicates a 1, a slope indicator having a value of 1 is provided to the slope to command encoder 114. If the first sample indicates a 0 and a second sample indicates a 0, a slope indicator having a value of 0 is generated and provided to the slope to command encoder 114.

The slope command encoder 114 receives the sequence of slope indicators for each cycle and generates a command from a group of extended commands. The possible commands include, but are not limited to wait, back, forward, done, invert, probable back, and probably forward. The "wait" command indicates do nothing, wait for more samples. This may occur when no slope indicators show a transition. The "back" command indicates that a clock phase later than a current used clock phase should be used. Here, the slope indicators show a slope indicating an edge, but it is too early. The "forward" command indicates that a clock phase earlier than a current used clock phase should be used. Here, the slope indicators show a slope indicating an edge, but it is too late. The "done" command indicates that the currently used clock phase fits. Thus, the slope indicators show the edge at the appropriate time. The "invert" command indicates that the currently used clock phase shifted by 180 degrees fits. The "probable forward" command indicates that there is a sampling error, but a clock phase earlier than the currently used clock phase probably should be used. Here, the slope indicators identify an extra transition, which could be due to noise. The "probable back" command indicates that there is a sampling error, but a clock phase later than the currently used clock phase should probably be used. Here, the slope indicators identify an extra transition, which could be due to noise.

In one example, the extended commands are derived from a lookup table according to the received sequence of slope indicators. Each sequence of slope indicators corresponds to a clock phase or cycle. In one example, the sequences of slope indicators are inputs to a demux circuit that selects an appropriate extended command. It is noted, however, other suitable mechanisms can be employed to derive the extended commands from the sequence of slope indicators.

The noise logic 118 also receives the slope indicators from the slope detector 112. Noise and offsets are often present in incoming signals and can be introduced from distortions and interference such as reflections, attenuation, crosstalk, and interference. The noise logic 118 analyzes transitions or slopes to determine the probability of noise and/or voltage offsets present in the incoming signal. The noise logic 118 then generates a noise indication signal, which includes noise related information, such as the probability of noise and/or voltage offsets being present and can indicate the probability of extended commands being wrong. Using the noise indication signal can improving locking time and provide reasonable adjustments.

Figure 3A:
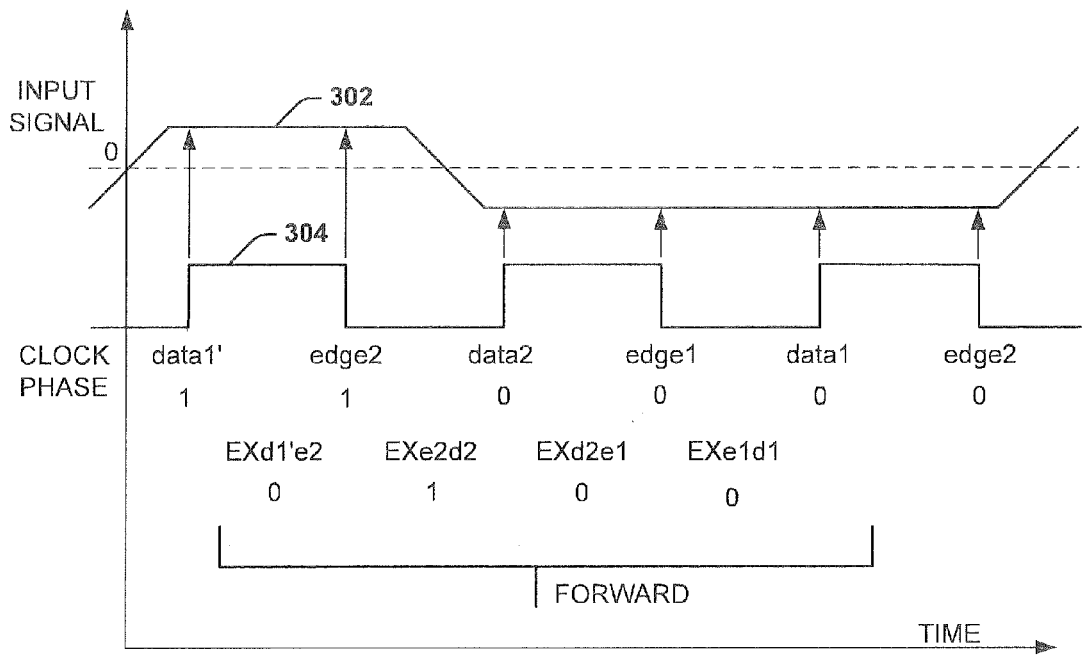
FIG. 3A is a timing diagram illustrating generation of a command from an incoming signal in accordance with an embodiment of the invention.
Figure 3B:
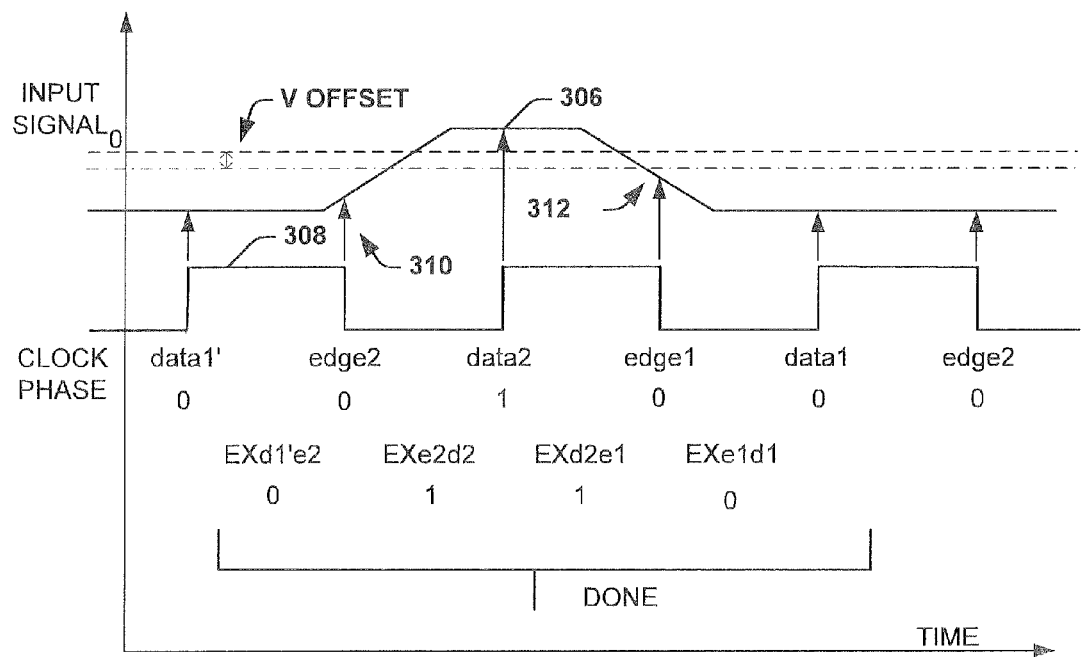
FIG. 3B is a timing diagram illustrating generation of a command from an incoming signal in accordance with an embodiment of the invention.

FIGS. 3A and 3B are timing diagrams provided in order to further illustrate the present invention. The diagrams indicate examples of some of the possible incoming signals and sampling arrangements in accordance with embodiments of the invention. The diagrams are discussed in reference to the system 100 of FIG. 1 in order to further illustrate the present invention in a non-limiting manner.

FIG. 3A is a timing diagram illustrating generation of a command from an incoming signal in accordance with an embodiment of the invention. Incoming data, also referred to as an incoming signal, is shown at 302. A clock phase, or a phase adjusted clock 118 is shown at 304. Here, data samples are sequentially taken on rising edges of the clock and edge samples are sequentially taken on falling edges of the clock. A first sample, data1' is a last sample from a prior cycle and yields a 1 because the incoming data is 1 or high at the time of the sample. A second sample, edge2, yields a 1 because the incoming data is 1 or high at the time of the sample. A slope transition detector, such as the detector 112 of FIG. 2, performs an exclusive OR (XOR) of the two samples to determine the presence of a transition from the first sample to the second sample. Here, no transition has occurred and the XOR value of the samples is 0, which indicates not transition. Thus, a first slope indicator, EXd1'e2, is set to 0.

A third sample, data2, yields a 0 because the incoming data is 0 or low at the time of the sample. The slope transition detector performs an XOR on the second and third samples and determines a slope or transition has occurred. Thus, a second slope indicator, Exe2$d2$ is set to 1. Remaining samples, edge1, data1, and edge2, all yield a 0. The slope transition detector performs XORs on the pairs in sequence and, as expected does not identify a slope or transition in the remaining samples. The sequence of slope indicators yields "0, 1, 0, 0", which is interpreted by the slope to command encoder as "forward" and an earlier clock phase should be used for the phase adjusted clock. The forward command agrees visually with the diagram itself as it can be seen that the clock phase should be earlier than the current clock phase in order for the edge samples to be closer to the edge or transition of the input data.

FIG. 3B is a timing diagram illustrating generation of a command from an incoming signal in accordance with an embodiment of the invention. This diagram shows input signal having a voltage offset and slow slopes. The input signal, also referred to as an incoming signal, is shown at 306. A clock phase, or a phase adjusted clock 118 is shown at 308. Data samples are sequentially taken on rising edges of the clock and edge samples are sequentially taken on falling edges of the clock. A first sample, data1' is a last sample from a prior cycle and yields a 0 because the input signal is 0 or low at the time of the sample. A second sample, edge2, yields a 0 because the input signal is 0 or high at the time of the sample. The input signal 306 as shown at 310 has a slow slope and, as a result, edge2 yields the 0. Had the incoming data 306 had a faster slope, edge2 could have yielded a 1 instead. A slope transition detector, such as the detector 112 of FIG. 2, performs an exclusive OR (XOR) of the two samples to determine the presence of a transition from the first sample to the second sample. Here, no transition has occurred and the XOR value of the samples is 0, which indicates not transition. Thus, a first slope indicator. EXd1'e2, is set to 0.

A third sample, data2, yields a 1 because the incoming data is 1 or high at the time of the sample. The slope transition detector sets a second slope indicator, Exe2$d2$ to 1, which indicates that a transition has occurred. A fourth sample, edge1, yields a 0 because the incoming data is 0 or low at the time of the sample. The slope transition detector determines that another transition or slope has occurred and sets a third slope indicator, EXd2$e1$, to 1. The remaining samples yield 0 values and set the fourth slope indicator to 0 as well.

The sequence of slope indicators analyzes the sequence of slope indicators for the cycle and determines that the current clock phase fits and generates a "done" command. It is appreciated that conventional systems may not result in the proper determination due to several factors. One being the lack of sampling to detect transitions in signals with noise or slow slopes. Another being that interpretation of samples would result in waiting or "do nothing", thereby delaying locking the phase.

Viewing the clock phase and the input signal of FIG. 3B, it can be seen visually that the edge and data samples are at the proper phases and the current clock phase fits the input signal.

FIGS. 4A and 4B show an example configuration of samplers and values, derived slopes based on the samples, and derived commands based on the derived slopes. FIG. 4A shows an example of possible samples for a configuration of a phase detector, such as phase detector 106 of FIG. 1 in accordance with an embodiment of the invention. In this configuration, there are 4 samples obtained per cycle, edge2, data2, edge1 and data1. The samples can be obtained using four samplers clocked via a phased adjusted clock signal.

Alternately, the samples can be obtained using two samplers operating twice the frequency and utilizing latching to maintain the first two samples. Continuing the current configuration, a last sample of a previous cycle is also present via a latching stage, such as the latching stage 120 of FIG. 2. The last or prior sample is shown as data1'. The samples are shown as a logical truth table, not an experimental or theoretical run.

FIG. 4B shows derived slopes and commands according to the samples of FIG. 4A. The derived slopes, or sequence of slope indicators is derived from samples of a corresponding cycle of FIG. 4A. Slope indicator d1'e2 is an XOR of samples data1' and edge2. Slope indicator e2d2 is an XOR of samples edge2 and data2. Slope indicator d2e1 is an XOR of samples data2 and edge1. Slope indicator e1d1 is an XOR of samples edge1 and data1.

A clock phase of the phase adjusted clock signal is locked or fits when the edge samples are on edges of the incoming signal and the data samples are on data portions, or centered between edges of the incoming signal. Thus, transitions or slopes should be centered around data samples, otherwise adjustment is necessary. The derived commands indicate status of current phase of the phase adjusted clock signal and adjustment required, if any, to identify a phase that fits.

For example, cycle 1 shows no transitions. Thus, there is no information on which to adjust the phase so a "wait" command is issued, which means do nothing and wait for more samples. Cycle 2 shows a transition between sample edge1 and data1, thus an earlier clock phase than the current clock phase is needed and the command "forward" is issued. Cycle 3 shows transitions between data2 and edge1 and edge1 and data1, which indicates that the incoming signal is inverted and a phase adjustment of 180 degrees is needed and the "invert" command is issued. Cycle 4 shows a transition between data2 and edge1, which indicates that a later clock phase should be used and a "back" command is issued. Cycle 5 shows transitions between edge2 and data 2 and data2 and edge 1, indicating the data is centers and the current phase fits and a "done" command is issued. Cycle 6 shows transitions between edge2 and data2 and data2 and edge1 and edge1 and data1, which indicate the presence of a sampling error, but the phase should probably be shifted forward and a command of "probable forward" is issued. There shouldn't be three transitions in a row and conventional phase alignment mechanisms would ignore the data, however recognizing that shifting the phase forward is probably correct, could permits faster locking on. Cycle 16 indicates a single transition between data1' and edge2, which indicates that a later phase shift than the current phase is needed and a "back" command is issued. Cycle 19 shows transitions between data1' and edge2; data2 and edge1; and edge1 and data1, which indicates some noise or sampling error but an earlier clock phase is probably needed and a "probably back" command is issued.

Figure 5:
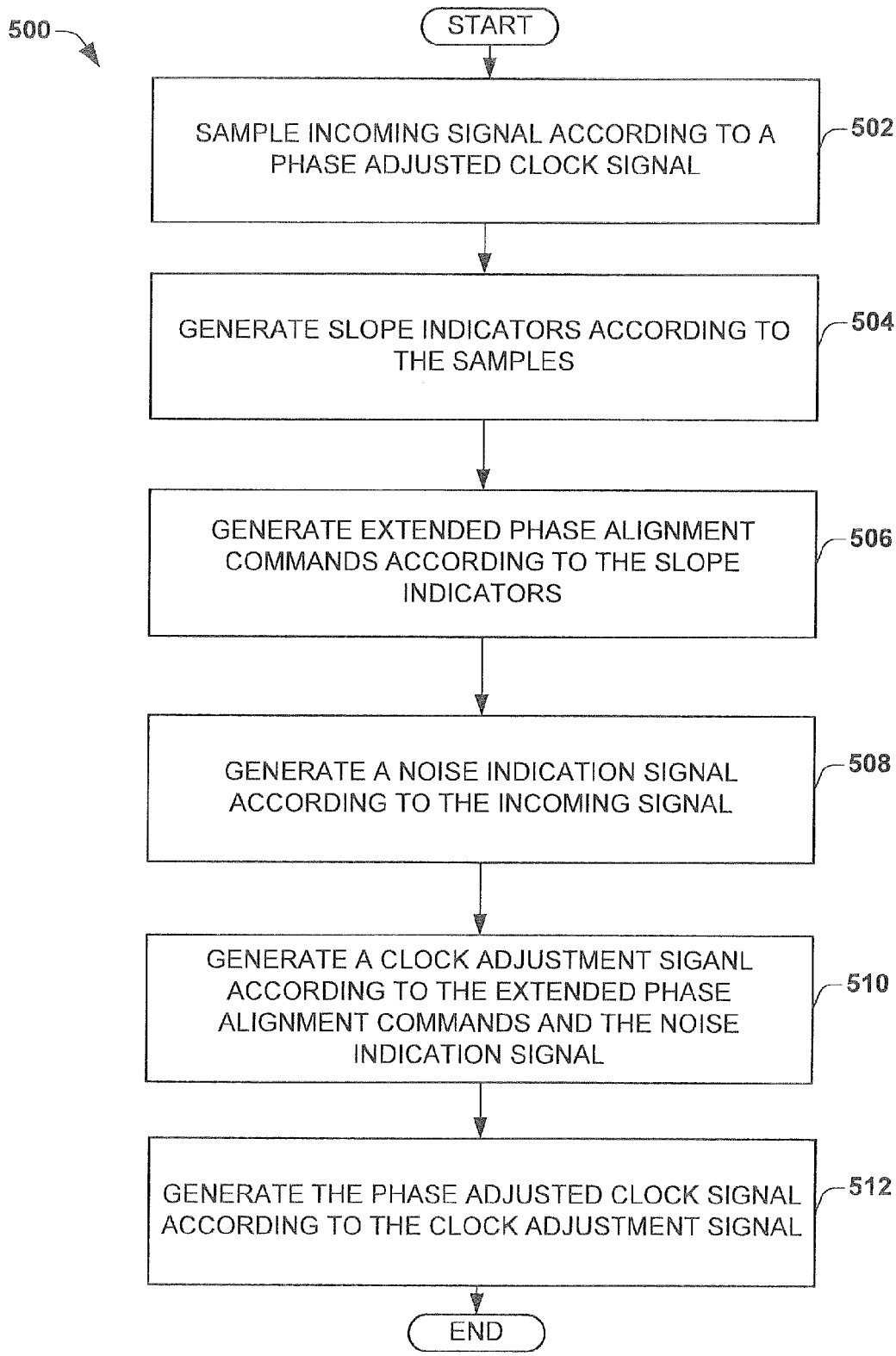
FIG. 5 is a flow diagram illustrating a method of performing phase alignment in accordance with an embodiment of the invention.

FIG. 5 is a flow diagram illustrating a method 500 of performing phase alignment in accordance with an embodiment of the invention. The method 500 performs phase alignment for an incoming signal, comprised of a serial digital data stream. The method 500 is shown in an order, however it is appreciated that the invention contemplates performing the method 500 in other suitable sequences, omitting blocks, and performing additional method blocks not shown.

The method begins at block 502, wherein an incoming signal is sampled according to a phase adjusted clock signal. As stated above, the incoming signal is a serial digital data stream. The phase adjusted clock signal operates at a frequency selected to be relatively close to the frequency of the incoming signal. The incoming signal is sampled at suspected edge and data positions to generate samples comprising edge samples and data samples. The number of samples obtained per clock phase can vary according to the factors described above and including noise levels, anticipated voltage offsets, desired lock time, and the like. In one example, rising and falling edges of the phase adjusted clock signal trigger sampling of the incoming signal.

Slope indicators are generated at block 504 to indicate a presence or absence of transitions or slopes between the samples. A slope indicator indicates a transition on a logical value between a first sample and a second sample, in series, being varied. Thus, for example, a slope indicator of 1 can indicate a transition or slope between the first sample at 0 and the second sample at 1.

Extended phase alignment commands are generated at block 506 according to the generated slope indicators. The extended commands include commands indicating that the phase needs to be adjusted earlier or later than the current phase, wait for more information, and the current phase fits. Additionally the extended commands include probable commands that indicate phase adjustments that are likely or possible to move the phase of the phase alignment clock towards locking with the incoming signal. The probable commands indicate irregular sequences of slope indicators that may be the result of noise and/or voltage offset.

A noise indication signal is generated according to the incoming signal at block 508. The noise indication signal is generated by analyzing the incoming signal to determine an amount of noise present.

A clock adjustment signal is generated at block 510 according to the extended phase alignment commands and the noise indication signal. The clock adjustment signal includes a direction of phase adjustment. In one example, the clock adjustment signal also includes an amount of phase adjustment. The extended phase alignment commends may indicate the direction of phase adjustment or that no adjustment is necessary. The noise indication signal may indicate that a current extended phase alignment command should be ignored. In one example, the clock adjustment signal omits a phase adjustment on the noise indication signal being above a specified threshold.

The phase adjusted clock signal is generated at block 512 according to the clock adjustment signal. The clock adjustment signal is either maintained at the current phase or moved earlier (forward) or later (back) by an amount. The amount can be predetermined, dynamically determined, or specified as part of the clock adjustment signal. The phase adjusted clock signal can then be utilized to obtain samples for a next clock phase of the incoming signal and the method can repeat until phase alignment with the incoming signal is obtained.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A phase alignment system comprising:
   a plurality of samplers configured to receive an incoming signal and a phase adjusted clock signal and to provide samples according to the incoming signal and the phase adjusted clock signal;
   a clock distributor configured to receive a clock adjustment signal and to generate the phase adjusted clock signal according to the clock adjustment signal;
   a phase detector configured to receive the samples from the plurality of samplers and to provide extended phase alignment commands according to the received samples, wherein the extended phase alignment commands include probable commands; and
   a phase alignment control configured to receive the extended phase alignment commands and to provide the clock adjustment signal to the clock distributor.

2. The system of claim 1, wherein the phase adjusted clock signal operates at a frequency similar to the incoming signal.

3. The system of claim 1, wherein the phase adjusted clock signal comprises a plurality of phase adjusted clock signals.

4. The system of claim 1, wherein the clock distributor uses a later phase in response to the clock adjustment signal.

5. The system of claim 1, wherein the clock distributor makes a phase adjustment amount and direction according to the clock adjustment signal.

6. The system of claim 1, wherein the clock adjustment signal indicates a direction of phase adjustment.

7. The system of claim 6, wherein the clock adjustment signal further indicates an amount of phase adjustment.

8. The system of claim 1, wherein the phase detector includes a slope detector and a command encoder coupled to the slope detector.

9. The system of claim 8, wherein the slope detector is configured to receive the samples and generates slope indicators according to the samples.

10. The system of claim 9, wherein the command encoder receives the slope indicators and generates commands according to the slope indicators.

11. The system of claim 10, wherein a current cycle of the incoming signal corresponds to four samples of the current cycle, a sample of a previous cycle, four slope indicators, and a command derived from the four slope indicators.

12. The system of claim 1, wherein the extended phase alignment commands include forward, back and done.

13. The system of claim 12, wherein the extended phase alignment commands further include probable forward, probable back, and invert.

14. A phase alignment system comprising:
    a plurality of samplers configured to receive an incoming signal and a phase adjusted clock signal and to provide samples according to the incoming signal and the phase adjusted clock signal;
    a clock distributor configured to receive a clock adjustment signal and to generate the phase adjusted clock signal according to the clock adjustment signal;
    a phase detector have a slope detector, a command encoder and noise logic, wherein the slope detector is configured to receive the samples and generates slope indicators according to the samples, the command encoder is configured to receive the slope indicators and to derive the extended phase alignment commands, and the noise logic is configured to generate a noise indication signal according to the slope indicators; and
    a phase alignment control configured to receive the extended phase alignment commands and a noise indication signal and provide a clock adjustment signal to the clock distributor.

15. The system of claim 14, wherein the extended phase alignment commands include directional indicators and probable indicators.

16. The system of claim 15, wherein the probable indicators show the presence of a noise error in the samples.

17. The system of claim 15, wherein the clock adjustment signal indicates a directional phase adjustment on the noise indication signal being below a threshold value.

18. The system of claim 17, wherein the threshold value corresponds to a probability of the directional phase adjustment being in the correct direction of at least 50 percent.

19. A method of performing phase alignment, the method comprising:
    sampling an incoming signal according to a phase adjusted clock signal to generate samples, the incoming signal comprising a serial digital data stream;
    generating slope indicators that indicate a presence of transitions between individual samples of the generated samples;
    generating extended phase alignment commands according to the generated slope indicators;
    generating a noise indication signal according to the generated slope indicators;
    generating a clock adjustment signal according to the extended phase alignment commands and the noise indication signal; and
    generating the phase adjusted clock signal according to the clock adjustment signal.

20. The method of claim 19, wherein generating the clock adjustment signal comprises adjusting a next phase in a forward or backward direction specified by the extended phase alignment commands.

* * * * *